(12) United States Patent
Hung et al.

(10) Patent No.: US 7,869,215 B2
(45) Date of Patent: Jan. 11, 2011

(54) PORTABLE ELECTRONIC DEVICE INCORPORATING EXTENDABLE HEAT DISSIPATION DEVICE

(75) Inventors: Jui-Wen Hung, Taipei Hsien (TW); Nien-Tien Cheng, Taipei Hsien (TW); Ping-Yang Chuang, Taipei Hsien (TW)

(73) Assignee: Foxconn Technology Co., Ltd., Tucheng, Taipei County (TW)

( * ) Notice: Subject to any disclaimer, the term of this patent is extended or adjusted under 35 U.S.C. 154(b) by 0 days.

(21) Appl. No.: 12/506,214

(22) Filed: Jul. 20, 2009

(65) Prior Publication Data

US 2010/0259893 A1    Oct. 14, 2010

(30) Foreign Application Priority Data

Apr. 8, 2009    (CN) .................... 2009 1 0301387

(51) Int. Cl.
*H05K 7/20*    (2006.01)
*H01L 23/34*    (2006.01)

(52) U.S. Cl. .............. 361/704; 361/707; 361/715; 361/710; 361/719; 257/719

(58) Field of Classification Search .......... 361/715
See application file for complete search history.

(56) References Cited

U.S. PATENT DOCUMENTS

| | | | | |
|---|---|---|---|---|
| 4,825,337 A | * | 4/1989 | Karpman | 361/716 |
| 5,473,506 A | * | 12/1995 | Kikinis | 361/688 |
| 5,475,563 A | * | 12/1995 | Donahoe et al. | 361/695 |
| 5,640,302 A | * | 6/1997 | Kikinis | 361/679.41 |
| 5,808,869 A | * | 9/1998 | Donahoe et al. | 361/704 |
| 5,861,873 A | * | 1/1999 | Kikinis | 345/157 |
| 6,205,023 B1 | * | 3/2001 | Moribe et al. | 361/704 |
| 6,856,511 B1 | * | 2/2005 | Viernes et al. | 361/704 |
| 6,882,533 B2 | * | 4/2005 | Bash et al. | 361/696 |
| 7,023,701 B2 | * | 4/2006 | Stocken et al. | 361/704 |
| 7,133,285 B2 | * | 11/2006 | Nishimura | 361/715 |
| 7,551,438 B2 | * | 6/2009 | Seki | 361/699 |
| 7,733,652 B2 | * | 6/2010 | Costello et al. | 361/704 |

* cited by examiner

*Primary Examiner*—Gregory D Thompson
(74) *Attorney, Agent, or Firm*—Frank R. Niranjan

(57) ABSTRACT

An electronic device includes a casing, an electronic component received in the casing, and a fixing member. The casing includes a cutout defined in a side wall thereof for assembly or disassembly a heat dissipation member into or out of the electronic device. The fixing member is connected to the top wall of the casing. The fixing member includes an elongated pole, a guiding pole connected to an outer end of the elongated pole and located adjacent to the cutout, and a resilient element at an inner end of the elongated pole and located over the electronic component. The resilient element is compressed and abuts the heat dissipation member when the heat dissipation member is assembled into the electronic device to contact with the electronic component.

15 Claims, 6 Drawing Sheets

PORTABLE ELECTRONIC DEVICE INCORPORATING EXTENDABLE HEAT DISSIPATION DEVICE

BACKGROUND

1. Technical Field

The disclosure generally relates to portable electronic devices, and particularly to a portable electronic device having an extendable heat dissipation device which can be assembled to/disassembled from the portable electronic device conveniently.

2. Description of Related Art

With the continuing development of electronic technology, processors of the electronic devices have become faster and faster, which causes the processors to generate more and more redundant heat. Heat dissipation devices, such as metal heat sinks, are traditionally disposed in the electronic devices to transfer heat of the processors to an outside, thus to maintain a stability and normal performance of the electronic devices. Generally, the processor is enclosed in a casing of the electronic device, and the heat dissipation device is firmly secured onto a back plate or a circuit board in the casing through screws or rivets. Thus when the heat dissipation device needs to be replaced, the casing of the electronic device must be disassembled for taking the old heat dissipation device away or putting a new heat dissipation device into the casing, which is complicated and inconvenient.

For the foregoing reasons, therefore, there is a need in the art for an electronic device incorporating an extendable heat dissipation device which overcomes the limitations described.

DETAILED DESCRIPTION

Figure 1:
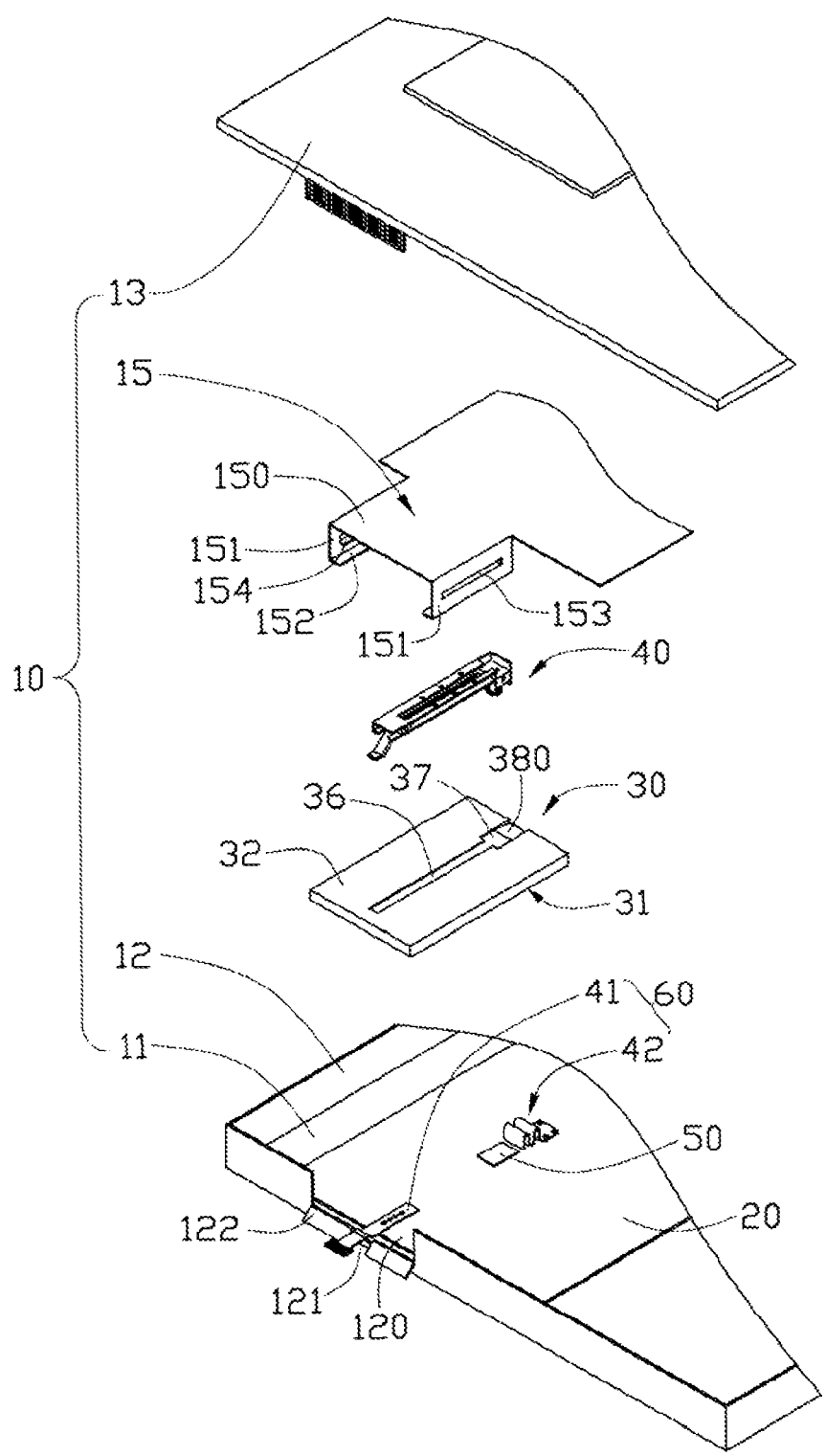
FIG. 1 is an isometric, exploded view of an electronic device according to an exemplary embodiment.

Referring to FIG. 1, a portable electronic device according to an exemplary embodiment is shown. The portable electronic device can be a notebook computer, or a portable DVD player, and includes a casing 10, a circuit board 20, an electronic component 50, a heat dissipation member 30, a guiding member 15, a fixing member 40, and a positioning member 60.

The casing 10 includes a rectangular bottom wall 11, a rectangular top wall 13 parallel to the bottom wall 11, and four side walls 12 extending perpendicularly from four lateral sides of the bottom wall 11 to the top wall 13. A space 100 (FIG. 6) is thus defined in the casing 10 among the top wall 13, the bottom wall 11, and the side walls 12. A cutout 120 is defined in a left side wall 12 of the casing 10 communicating the space 100 with an outside of the casing 10. A covering plate 122 is rotatably connected to the left side wall 12 at a bottom of the cutout 120. The covering plate 122 can rotate to seal the cutout 120. A slot 121 is defined in a middle of the covering plate 122 communicating the cutout 120.

The circuit board 20 is fixedly received in the space 100 of the casing 10. The electronic component 50 is arranged on and electronically connected to the circuit board 20. A position of the electronic component 50 is aligned with the cutout 120 of the left side wall 12 of the casing 10. A top side of the electronic component 50 is substantially coplanar with the bottom of the cutout 120. The heat dissipation member 30 can be assembled onto or disassembled from the electronic component 50 through the cutout 120 of the casing 10.

The positioning member 60 includes an operating element 41 and an elastic element 42 respectively arranged at left side and right side of the electronic component 50. Both of the operating element 41 and the elastic element 42 are fixedly connected to the circuit board 20. Generally, the operating element 41, the elastic element 42, the electronic component 50, and the slot 121 of the covering plate 122 are substantially collinear.

Figure 5:
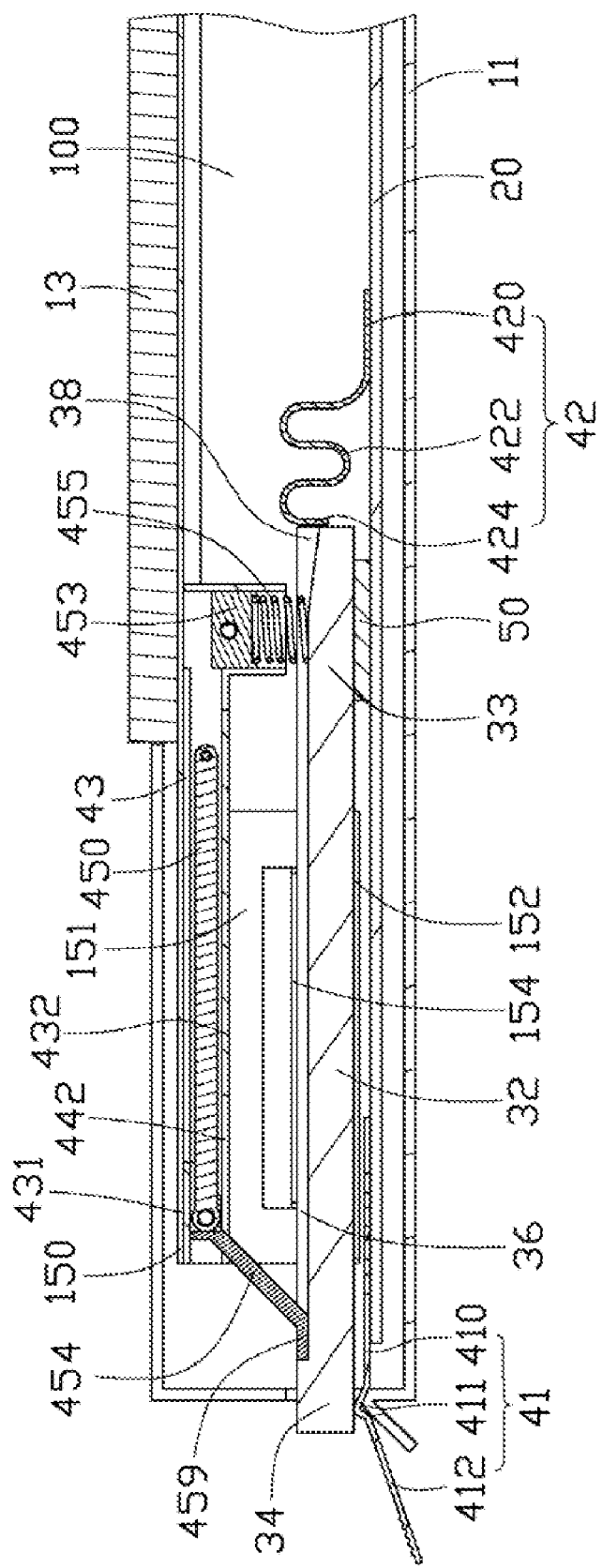
FIG. 5 is a cross-sectional view showing a heat dissipation member to be assembled into the electronic device.
Figure 6:
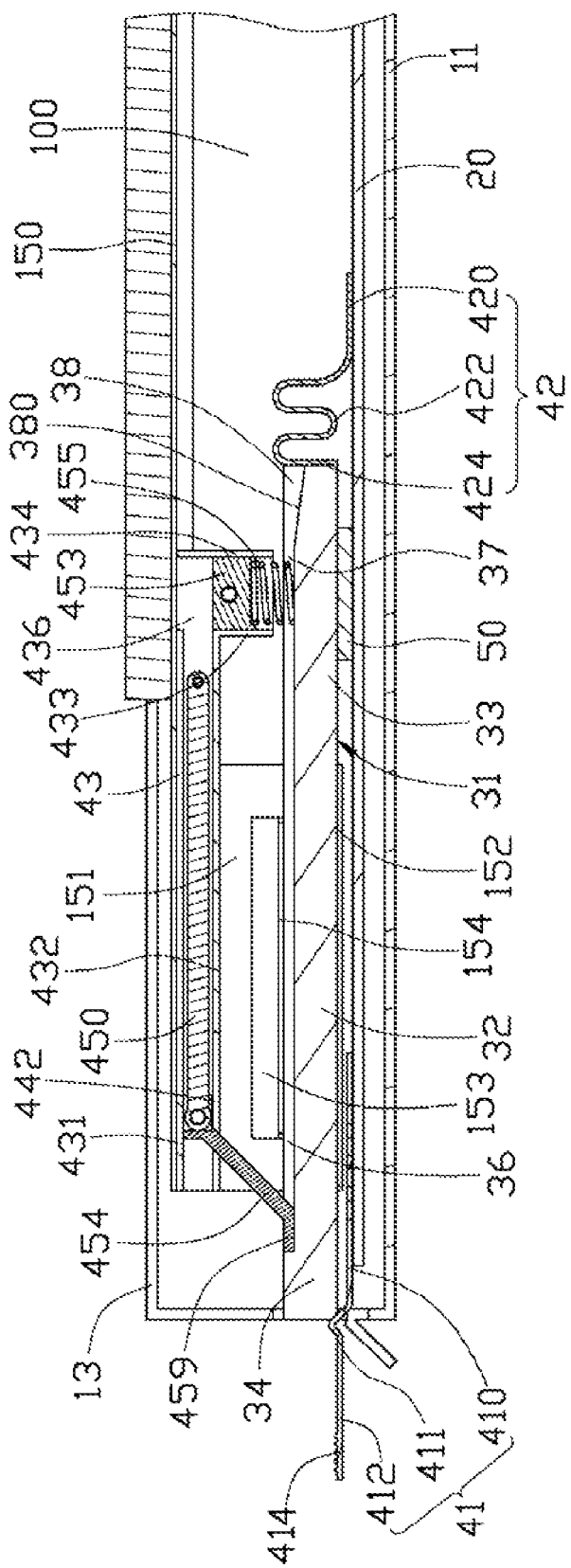
FIG. 6 is similar to FIG. 5, but shows that the heat dissipation member has been completely assembled into the electronic device.

Referring to FIGS. 5 and 6 simultaneously, in this embodiment, the elastic element 42 is formed by bending a narrow sheet upward and downward alternately. The elastic element 42 includes a flat right end 420 fixed on the circuit board 20 by rivets, and a wave-shaped main body 422 extending from the fixed right end 420 leftwards. The main body 422 of the elastic element 42 can deform in a left-to-right direction to change a length thereof in the left-to-right direction. A contacting portion 424 is formed at a left end of the main body 422 for engaging with the heat dissipation member 30. The contacting portion 424 of the elastic element 42 is vertical, being perpendicular to the circuit board 20. The contacting portion 424 is spaced from the electronic component 50 a small distance when the elastic element 42 is at free.

The operating element 41 is far away from the electronic component 50, whilst adjacent to the cutout 120 of the casing 10. The operating element 41 includes a fixed portion 410, an operating portion 412, and an engaging portion 411 between the fixed portion 410 and the operating portion 412. The fixed portion 410 is firmly connected to the circuit board 20. The engaging portion 411 is generally inverted V-shaped, and straddles the left side wall 12 of the casing 10 at a position corresponding to the slot 121 of the covering plate 122. The operating portion 412 is located at the outside of the casing 10. A number of teeth 414 (FIG. 6) are formed at a left end of the operating portion 412. The teeth 414 are provided for facilitating a grip and manipulation of the positioning member. The operating portion 412 and the fixed portion 410 both are horizontal, and the operating portion 412 is a little higher than the fixed portion 410 when the operating element 41 is at free, not subject to an external force.

The heat dissipation member 30 is a metal block, which usually made of copper, or copper alloy. A size of the heat dissipation member 30 is much larger than that of the electronic component 50. A width of the heat dissipation member 30 substantially equals to a width of the cutout 120 of the left side wall 12 of the casing 10, and a length of the heat dissipation member 30 is a little larger than a distance between the engaging portion 411 of the operating element 41 of the positioning member 60 and the contacting portion 424 of the elastic element 42 at free. In this embodiment, the heat dissipation member 30 is generally rectangular, and forms a planar bottom surface 31 for contacting the electronic component 50.

An elongated groove 36 is defined in a top surface 32 of the heat dissipation member 30 extending along the left-to-right direction. A length of the elongated groove 36 is smaller than that of the heat dissipation member 30, with left and right ends thereof spaced a distance from left and right sides of the heat dissipation member 30. A receiving groove 37 is formed at a right end of the elongated groove 36 with a width larger than that of the elongated groove 36. A sliding groove 38 (FIG. 2) extends from the receiving groove 37 through the right side of the heat dissipation member 30 with a depth gradually increased. Thus an inclined surface 380 (FIGS. 1 & 6) is formed at a bottom of the sliding groove 38.

Referring to FIG. 1 again, the guiding member 15 includes a top plate 150 fixed on the top wall 13 of the casing 10, and a pair of side plates 151 extending downwardly from front and rear sides of the top plate 150, respectively. The side plates 151 are parallel to and spaced from each other. A distance between the side plates 151 substantially equals to the width of the heat dissipation member 30. A bottom flange 152 extends perpendicularly from a bottom side of each side plate 151 towards the other side plate 151. An upper surface of each bottom flange 152 is substantially coplanar with the top side of the electronic component 50. A top flange 154 extends perpendicularly from a middle of each side plate 151 towards the other side plate 151. A notch 153 is defined in each side plate 151 corresponding to the top flange 154. The bottom flanges 152 are parallel to the top flanges 154. A distance between the top flanges 154 and the bottom flanges 152 is substantially the same as a thickness of the heat dissipation member 30.

Figure 3:
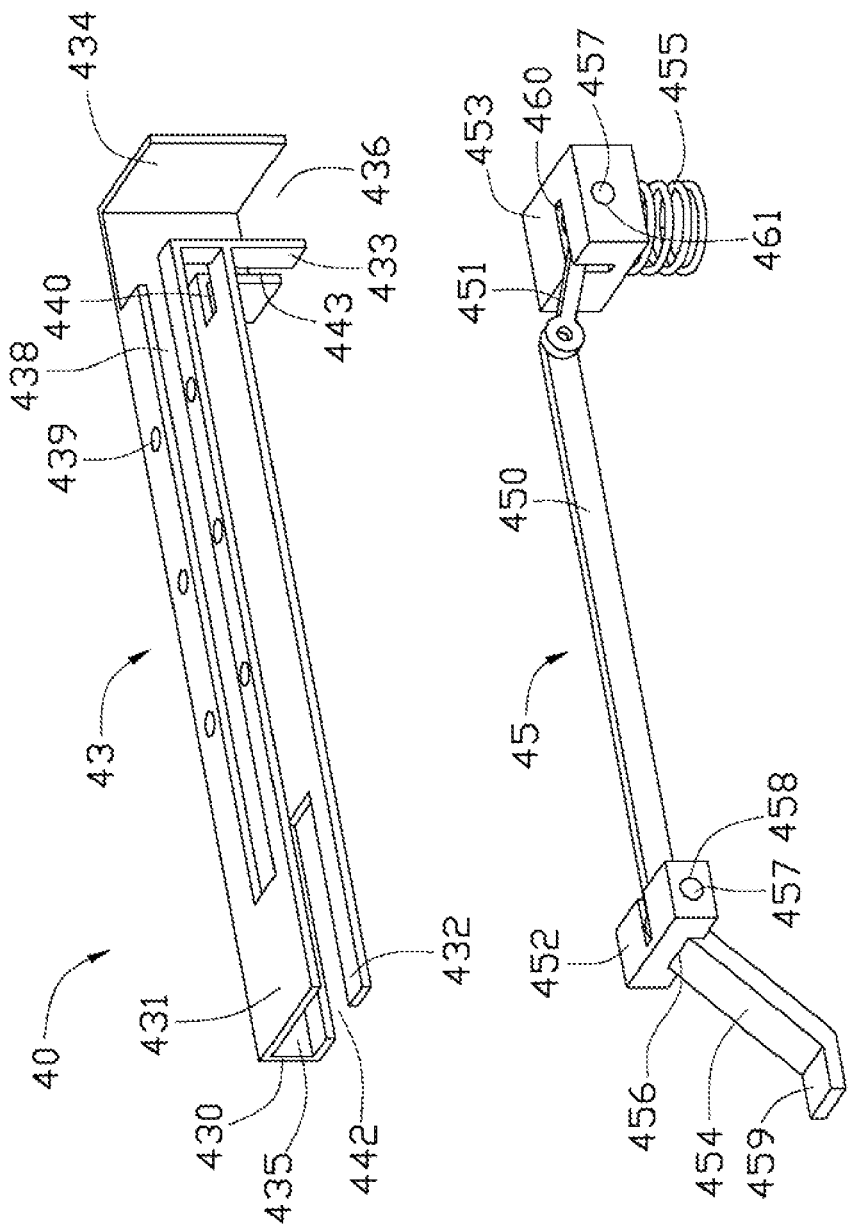
FIG. 3 is an explored, enlarged view of a fixing member of the electronic device of FIG. 1.
Figure 4:
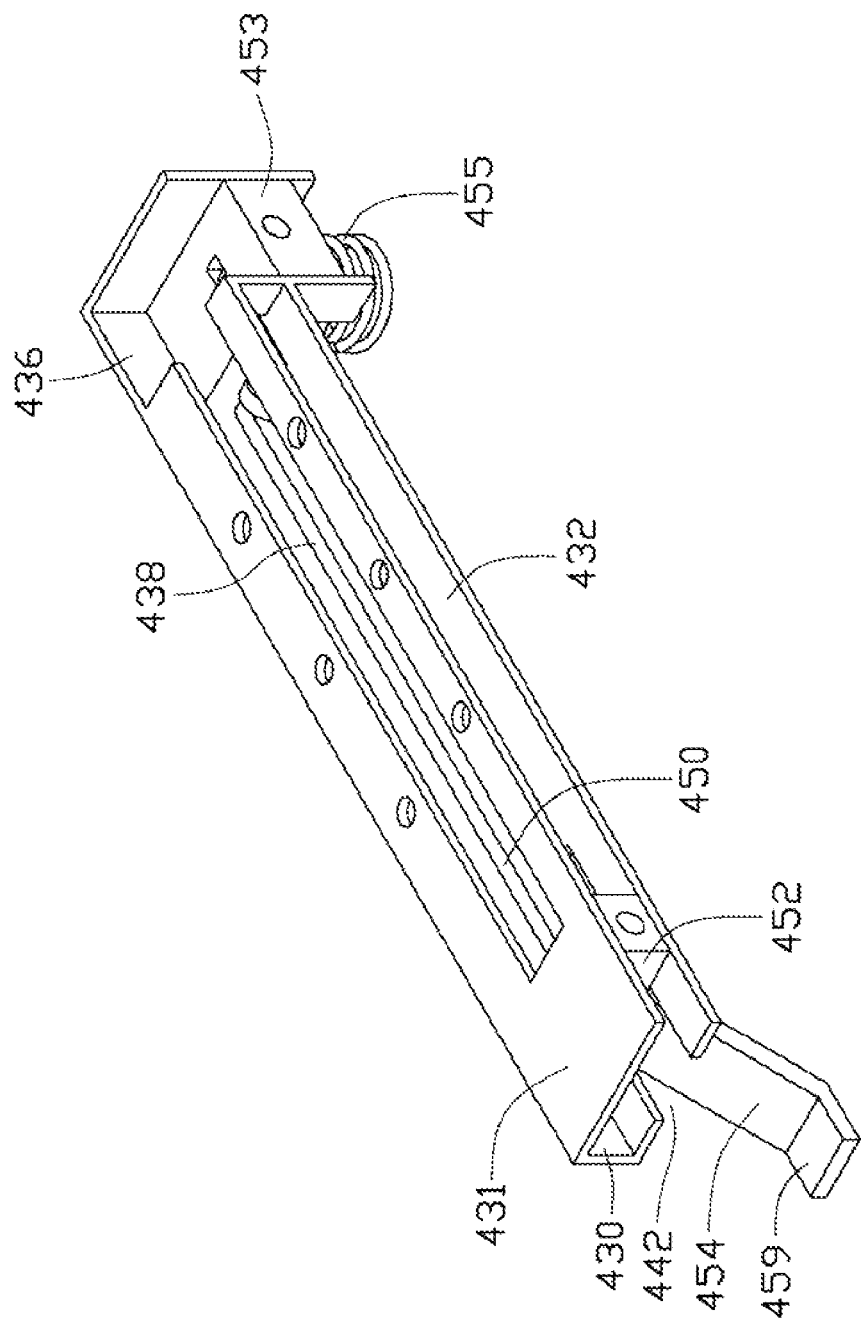
FIG. 4 is an assembled view of the fixing member of FIG. 4.

Referring to FIGS. 3-4, the fixing member 40 includes a fixing element 43 and a guiding element 45. The fixing element 43 includes a top board 431, a bottom board 432, and a back board 430. The top board 431 is parallel to and spaced from the bottom board 432. The back board 430 interconnects the top board 431 and the bottom board 432 at rear sides thereof. A chamber 435 is defined between the top board 431 and the bottom board 432 for receiving the guiding element 45. A latching groove 438 is defined in the top board 431 of the fixing element 43 with a right end thereof extending through the right side of the top board 431. A plurality of mounting holes 439 are defined in the top board 431 for fixing the fixing member 40 onto the guiding member 15. The mounting holes 439 are located at front and rear sides of the latching groove 438.

A first aperture 442 is defined in a left side of the bottom board 432, and a second aperture 440 is defined in a right side of the bottom board 432. The first aperture 442 and the second aperture 440 are collinear, and align with the latching groove 438 of the top board 431 of the fixing element 43. A first baffle 433 extends downwardly from the right side of the bottom board 432. A second baffle 434 extends frontward from a right side of the back board 430. The first baffle 433 and the second baffle 434 are parallel to and spaced from each other. An interstice 436 is defined between the first baffle 433 and the second baffle 434 communicating and perpendicular to the chamber 435 of the fixing element 43. The first baffle 433 defines a third aperture 443 at a middle thereof. The third aperture 443 is perpendicular to and communicates the second aperture 440 of the bottom board 432.

The guiding element 45 includes an elongated pole 450, a guiding pole 454, a connecting pole 451, a first block 452, a second block 453, and a resilient element 455. The first block 452 is arranged at a left end of the elongated pole 450. A height of the first block 452 equals to a distance between the top board 431 and the bottom board 432 of the fixing element 43 of the fixing member 40, i.e., a depth of the chamber 435. A width of the first block 452 is larger than that of the first aperture 442 of the bottom board 432. A first engaging groove 456 extends through the first block 452 along the top-to-bottom direction, and a first through hole 458 extends through the first block 452 along the front-to-rear direction. The first through hole 458 intersects the first engaging groove 456.

The guiding pole 454 slants from upper right to lower left. A right end of the guiding pole 454 is received in the first engaging groove 456. A pin 457 extends through the first through hole 458, the right end of the guiding pole 454 and a left end of the elongated pole 45 to assemble the guiding pole 454, the elongated pole 450 and the first block 452 together. A sliding block 459 is formed at a left end of the guiding pole 454. The sliding block 459 is flat and horizontal. A thickness of the sliding block 459 is substantially the same as the depth of the elongated groove 36, and a width of the sliding block 459 substantially equals to that of the elongated groove 36.

The connecting pole 451 slants from upper left to lower right with a left end thereof pivotably connected at a right end of the elongated pole 450. The second block 453 is arranged at a right end of the connecting pole 451. A shape and size of the second block 453 is the same as that of the interstice 436 of the fixing element 43. A second engaging groove 460 extends through the second block 453 along the top-to-bottom direction, and a second through hole 461 extends through the second block 453 along the front-to-rear direction. The second through hole 461 intersects the second engaging groove 460. The right end of the connecting pole 451 is received in the first engaging groove 456. A pin 457 extends through the second through hole 461 and the right end of the connecting pole 451 to assemble the connecting pole 451 and the second block 453 together.

The resilient element 455 is connected at a bottom side of the second block 453, and can deform elastically to change a length thereof in the top-to-bottom direction when the resilient element 455 is compressed or stretched. In this embodiment, the resilient element 455 is a coil spring with a top end connected at the second block 453 and a bottom end being free. The bottom end of the resilient element 455 at free is lower than the sliding block 459 of the guiding pole 454, and is not lower than the right side of the heat dissipation member 30 at the bottom of the sliding groove 38, i.e. the right edge of the inclined surface 380.

During assembly of the fixing member 40, the connecting pole 451 is connected to the right end of the elongated pole 450, and the resilient element 455 is connected at the elongated pole 450 via the second connecting pole 451, the second pin 457 and the second block 453. Then the elongated pole 450 with the connecting pole 451 and the resilient element 455 is mounted to the fixing element 43 through the latching groove 438 of the top board 431. The elongated pole 450 is received in the chamber 435, the second block 453 and the resilient element 455 are received in the interstice 436 of the fixing element 43, and the connecting pole 451 extends through the second aperture 440 and the third aperture 443. Since the connecting pole 451 is pivotable to the elongated pole 450, the resilient element 455 and the second block 453 can move vertically in the interstice 436 when the elongated pole 450 moves horizontally in the chamber 435.

The first block 452 is inserted into the chamber 435 through a left open side of the fixing element 43 with the left end of the elongated pole 450 received in the first engaging groove 456 thereof. In such a state, the first block 452 is located substantially at a middle of the first aperture 442. Then the guiding pole 454 is inserted into the first aperture 442 with the right end thereof extending into the first engaging groove 456 of the first block 452. Then the first pin 457 extends through the first block 452, the left end of the elongated pole 450 and the guiding pole 454 to assemble the guiding pole 454, the elongated pole 450 and the first block 452 together. The guiding pole 454 is firmly connected to the left end of the elongated pole 450 and the first block 452. Thus the fixing member 40 is assembled together.

Figure 2:
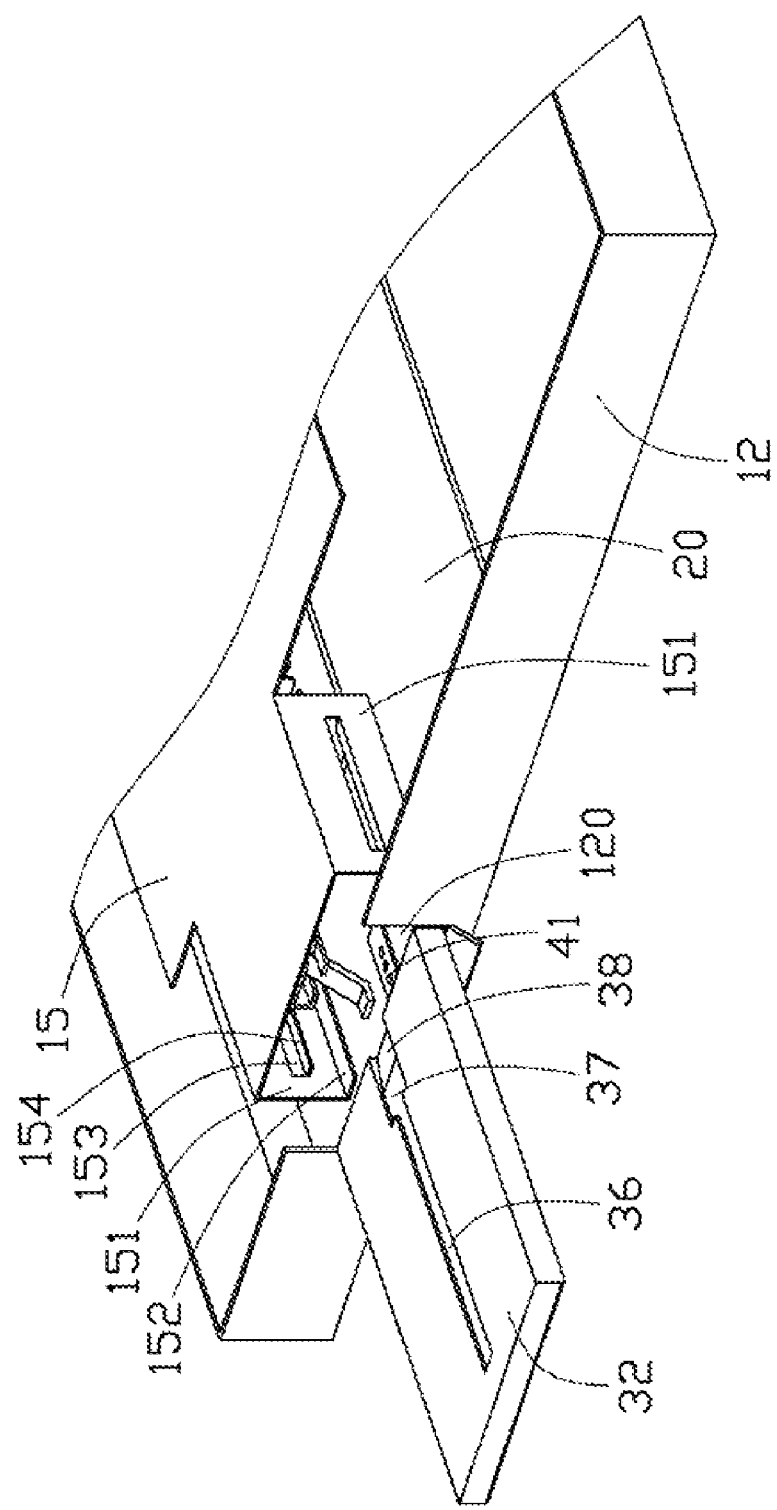
FIG. 2 is an assembled view of the electronic device of FIG. 1, with a top wall thereof being removed.

Referring to FIGS. 2 and 5, the fixing member 40 is assembled to guiding member 15 which is connected to the top wall 13 of the casing 10 of the electronic device by extending screws (not shown) through the mounting holes 439 of the top board 431 to engage with the top plate 150 of the guiding member 15. In such a state, the sliding block 459 of the guiding pole 454 is located adjacent to the cutout 120 of the left side wall 12, the resilient element 455 is located over the electronic component 50. A top side of the sliding block 459 is substantially coplanar with bottom sides of the top flanges 154 of the guiding member 15. Since the first block 452 is at a middle of the first aperture 442, the elongated pole 450 with the guiding pole 454 connected at the left end thereof can move rightward along the first aperture 442.

When assembles the heat dissipation member 30 to the electronic device, the operating portion 412 of the operating element 41 is pressed downwardly to cause the engaging portion 411 of the operating element 41 to move downwardly until a tip end of the engaging portion 411 is substantially coplanar with the upper surfaces of the bottom flanges 152 (FIG. 5). The heat dissipation member 30 is arranged at the cutout 120 of the left side wall 12 of the casing 10 with the sliding groove 38 thereof align with the sliding block 459 of the fixing member 40.

The heat dissipation member 30 is then pushed inwardly into the space 100 of the casing 10. During movement of the heat dissipation member 30, when the right side of the heat dissipation member 30 encounters the sliding block 459 of the fixing member 40, the sliding block 459 moves into the sliding groove 38 and then moves along the sliding groove 38. Then the heat dissipation member 30 encounters the guiding member 15. Since the distance between the top flanges 154 and the bottom flanges 152 equals to the thickness of the heat dissipation member 30 and the upper surfaces of the bottom flanges 152 are coplanar with the bottom surface 31 of the heat dissipation member 30, the heat dissipation member 30 can move into and along a passage between the top flanges 154 and the bottom flanges 152 to slide in the guiding member 15.

After sliding through an inner side of the guiding member 15, the heat dissipation member 30 reaches the electronic component 50. In this state, the right side of the heat dissipation member 30 encounters the bottom end of the resilient element 455. Since the bottom end of the resilient element 455 is not lower than the inclined surface 380 at the right side of the heat dissipation member 30, the resilient element 455 can move into the sliding groove 38 and along the inclined surface 380 and then to the receiving groove 37 until the sliding block 459 abuts the heat dissipation member 30 at the left end of the elongated groove 36. In such a state, the resilient is compressed and thus generates a force to cause the heat dissipation member 30 to contact the electronic component 50 tightly. The contacting portion 424 of the elastic element 42 abuts the right side of the heat dissipation member 30. The left side of the heat dissipation member 30 is still located at the outside.

Referring to FIG. 6, when the sliding block 459 engages with the heat dissipation member 30, the further inward movement of the heat dissipation member 30 causes the guiding pole 454 and the elongated pole 450 to also move further inward, which in turn causes the second block 453 to move downwardly. Thus, the second block 453 exerts a downward force on the heat dissipation member 30 via the resilient element 455. Therefore, the heat dissipation member 30 can be attached to the electronic component 50 more closely to effectively absorb heat generated by the electronic component 50.

The elastic element 42 is compressed when the heat dissipation member 30 moves inwardly. Finally the left side of the heat dissipation member 30 across the engaging portion 411 of the operating element 41 of the positioning member 60, and thus the heat dissipation member 30 is entirely mounted into the casing 10. The bottom end of the resilient element 455 is received in the receiving groove 37 and compressed. The elastic element 42 is compressed and abuts against the right side of the heat dissipation member 30 at the contacting portion 424 thereof. The operating element 41 is at a free state and abuts the left side of the heat dissipation member 30 at the engaging portion 411 thereof. Therefore, the heat dissipation member 30 on the electronic component 50 is stably fixed at the inserted position and contacts the electronic component 50 tightly.

When the heat dissipation member 30 needs to be replaced, the operating portion 412 of the operating element 41 is pressed downwardly to let the tip end of the engaging portion 411 being not higher than the top side of the electronic component 50, and thus the left side of the heat dissipation member 30 is free. The compressed elastic element 42 pushes the heat dissipation member 30 to move outwardly, and returns to its free state. Thus the heat dissipation member 30 can be drawn out from the casing 10 of the electronic device easily. Therefore, the heat dissipation member 30 of the present electronic device can be assembled to or disassembled from the electronic device easily and conveniently.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device, comprising:
an electronic component;
a casing defining a space receiving the electronic component therein, the casing comprising a top wall, a bottom wall parallel to the top wall, and a side wall between the top wall and the bottom wall, a cutout being defined in the side wall adapted for assembly of a heat dissipation member onto or disassembly the heat dissipation member from the electronic component, a width of the cutout being not smaller than that of the heat dissipation member; and
a fixing member comprising an elongated pole, a guiding pole connected to one end of the elongated pole and located adjacent to the cutout for guiding movement of the heat dissipation member, and a resilient element located over the electronic component, the resilient element being compressed and abutting the heat dissipation member when the heat dissipation member is assembled onto the electronic component.

2. The electronic device of claim 1, wherein the fixing member further comprises a connecting pole pivotably connected at an opposite end of the elongated pole and slants downwardly therefrom.

3. The electronic device of claim 2, wherein a flat sliding block is mounted at a bottom of the guiding pole, a bottom of the resilient element being lower than the sliding block with the resilient element connected to a lower end of the sliding block.

4. The electronic device of claim 3, wherein the heat dissipation member defines an elongated groove at a top side thereof for the sliding block moving therealong, and a receiving groove at an end of the elongated groove with a size larger than that of the elongated groove for receiving the bottom of the resilient member.

5. The electronic device of claim 4, wherein a sliding groove extends from the receiving groove through an inner side of the heat dissipation member with a depth thereof increasing gradually along an inward direction, an inclined surface being formed at a bottom of the sliding groove for facilitating entrance of the resilient element into the receiving groove.

6. The electronic device of claim 3, wherein the fixing member further comprises a fixing element, the fixing element comprising a top board, a bottom board, a back board connected between rear sides of the top board and the bottom board, a first baffle extending downwardly from the bottom board, and a second barrel extending frontward from a back board, a chamber being defined between the top board and the bottom board receiving the elongated pole therein, an interstice being defined between the first baffle and the second baffle receiving the resilient element therein, an aperture being defined in the bottom board opposite to the first baffle with the guiding pole extending therethrough.

7. The electronic device of claim 6, further comprising a guiding member connected to the top wall of the casing comprising a top plate and a pair of side plates extending downwardly from the top plate, the top board of the fixing element being connected to the top plate of the guiding member.

8. The electronic device of claim 7, wherein a bottom flange extends inwardly from a bottom side of each side plate towards the other side plate of the guiding member, and a top flange extends from a middle of each side plate plate parallel to the bottom flanges, a distance between the top flanges and the bottom flanges being substantially the same as a height of the heat dissipation member, and a distance between the side plates being substantially the same as the width of the heat dissipation member.

9. The electronic device of claim 1, further comprising an elastic element and an operating element arranged at opposite sides of the electronic component; respectively, the operating element comprising an inner end in the casing, an outer end extending outwardly beyond the casing and an engaging portion between the inner end and the outer end, the engaging portion being substantially inverted V-shaped, a distance between the engaging portion and the elastic element is smaller than a length of the heat dissipation member.

10. A fixing device, comprising:
a fixing element defining a first chamber and a second chamber, the first chamber being perpendicular to and communicating the second chamber; and
a guiding element comprising an elongated pole received in the first chamber, a connecting pole being rotatively connected to an end of the elongated pole, a resilient element connected to the connecting pole, and a guiding pole connected to an opposite end of the elongated pole, the resilient element being received in the second chamber and can move along the second chamber when the connected pole rotates with respect to the elongated pole.

11. The fixing device of claim 10, wherein the fixing element comprises a top board, a bottom board, a back board connected between rear sides of the top board and the bottom board, a first baffle extending downwardly from the bottom board, and a second baffle extending frontward from the back board, the first chamber being defined between the top board and the bottom board, the second chamber being defined between the first baffle and the second baffle.

12. The fixing device of claim 11, wherein an aperture is defined in the bottom board opposite to the first baffle, the guiding pole extending downwardly through the aperture and having a bottom being higher than a bottom of the resilient element.

13. The fixing device of claim 12, wherein the guiding pole is slanted, and a flat sliding block extends horizontally from the bottom of the guiding pole.

14. The fixing device of claim 13, further comprising a guiding member, the guiding member comprising a top plate and a pair of side plates extending downwardly from opposite sides of the top plate, the top board of the fixing element being connected at the top plate and spaced from the side plates.

15. The fixing device of claim 14, wherein a first flange extends perpendicularly from a bottom side of each side plate, and a second flange extends perpendicularly from a middle of each side plate, the second flanges being parallel to the first flanges, a bottom side of each second flange being coplanar with a top side of the sliding block.

* * * * *